(12) United States Patent
Su et al.

(10) Patent No.: US 11,900,917 B2
(45) Date of Patent: Feb. 13, 2024

(54) AUDIO RECOGNITION METHOD AND SYSTEM AND MACHINE DEVICE

(71) Applicant: TENCENT TECHNOLOGY (SHENZHEN) COMPANY LIMITED, Shenzhen (CN)

(72) Inventors: Dan Su, Shenzhen (CN); Jun Wang, Shenzhen (CN); Jie Chen, Shenzhen (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 391 days.

(21) Appl. No.: 17/230,515

(22) Filed: Apr. 14, 2021

(65) Prior Publication Data

US 2021/0233513 A1    Jul. 29, 2021

Related U.S. Application Data

(63) Continuation of application No. PCT/CN2020/072063, filed on Jan. 14, 2020.

(30) Foreign Application Priority Data

Jan. 29, 2019    (CN) .......................... 201910087286.4

(51) Int. Cl.
*G10L 15/07*    (2013.01)
*G10L 15/06*    (2013.01)
(Continued)

(52) U.S. Cl.
CPC ............. *G10L 15/063* (2013.01); *G06N 3/04* (2013.01); *G06N 3/08* (2013.01); *G10L 15/02* (2013.01);
(Continued)

(58) Field of Classification Search
CPC ........ G10L 15/063; G10L 15/02; G10L 15/22
See application file for complete search history.

(56) References Cited

U.S. PATENT DOCUMENTS 10,147,442 B1 *  12/2018  Panchapagesan ........ G06N 3/04
2010/0324912 A1    12/2010  Choo et al.
(Continued)

FOREIGN PATENT DOCUMENTS

CN    105491378 A    4/2016
CN    105551483 A    5/2016
(Continued)

OTHER PUBLICATIONS

The World Intellectual Property Organization (WIPO) International Search Report for PCT/CN2020/072063 dated Apr. 17, 2020 8 Pages (including translation).
(Continued)

*Primary Examiner* — Ibrahim Siddo
(74) *Attorney, Agent, or Firm* — ANOVA LAW GROUP, PLLC

(57) ABSTRACT

A neural network training method is provided. The method includes obtaining an audio data stream, performing, for different audio data of each time frame in the audio data stream, feature extraction in each layer of a neural network, to obtain a depth feature outputted by a corresponding time frame, fusing, for a given label in labeling data, an inter-class confusion measurement index and an intra-class distance penalty value relative to the given label in a set loss function for the audio data stream through the depth feature, and updating a parameter in the neural network by using a loss function value obtained through fusion.

20 Claims, 9 Drawing Sheets

(51) Int. Cl.
G06N 3/04 (2023.01)
G06N 3/08 (2023.01)
G10L 15/02 (2006.01)
G10L 15/16 (2006.01)
G10L 15/22 (2006.01)

(52) U.S. Cl.
CPC .............. *G10L 15/16* (2013.01); *G10L 15/22* (2013.01); *G10L 2015/0635* (2013.01)

(56) References Cited

U.S. PATENT DOCUMENTS

2019/0013015 A1    1/2019  Menendez-Pidal et al.
2019/0304438 A1*  10/2019  Qian ....................... G10L 15/07

FOREIGN PATENT DOCUMENTS

| CN | 106328122 A | 1/2017 |
| CN | 108109613 A | 6/2018 |
| CN | 108364662 A | 8/2018 |
| CN | 108922537 A | 11/2018 |
| CN | 109215662 A | 1/2019 |
| CN | 109859743 A | 6/2019 |

OTHER PUBLICATIONS

Na Li et al., "Deep Discriminative Embeddings for Duration Robust Speaker Verification," Interspeech 2018, Sep. 6, 2018 (Sep. 6, 2018), pp. 2262-2266. 5 pages.
S. Yadav et al., "Learning Discriminative Features for Speaker Identification and Verification," Interspeech 2018, Sep. 6, 2018 (Sep. 6, 2018), pp. 2237-2241. 5 pages.
The State Intellectual Property Office of the People's Republic of China (SIPO) Office Action 1 for for 201910741370.3 dated Aug. 31, 2020 14 Pages (including translation).
Wei-Lin Li et al., "Speech Recognition System Based on Deep Neural Network," Computer Science, vol. 42 No. 11A, Nov. 30, 2016, pp. 45-49. 5 pages.
S. Kim et al., "Joint CTC-Attention Based End-to-End Speech Recognition Using Multi-task Learning," ICASSP 2017, Dec. 31, 2017. 5 pages.
O. Kalinli et al., "Noise Adaptive Training For Robust Automatic Speech Recognition," IEEE Transactions on Audio, Speech, and Language Processing, pp. 1889-1901, 2010. 13 pages.
M.L. Seltzer et al., "An Investigation of Deep Neural Networks for Noise Robust Speech Recognition," in Proceedings of International Conference on Acoustics, Speech and Signal Processing (ICASSP). IEEE, 2013. 5 pages.
D. Yu et al., "Feature Learning in Deep Neural Networks—Studies on Speech Recognition Tasks," in Proceedings of International Conference on Learning Representation. IEEE, 2013. 9 pages.
D.Y. Kim et al., "Speech recognition in noisy environments using first-order vector Taylor series," Speech Communication, vol. 24(1), pp. 39-49, 1998. 11 pages.
Y. Wang et al., "Speaker and Noise Factorization for Robust Speech Recognition," IEEE Transactions on Audio, Speech and Language Processing, vol. 20(7), 2012. 9 pages.
G. Saon et al., "Speaker Adaptation of Neural Network Acoustic Models using I-Vectors," in Proceedings of IEEE Automatic Speech Recognition and Understanding Workshop. IEEE, 2013. 5 pages.
R. Hadsell et al., "Dimensionality Reduction by Learning an Invariant Mapping," in Proceedings of Computer vision and pattern recognition. IEEE computer society conference, 2006, vol. 2. 8 pages.
Y. Sun et al., "Deep Learning Face Representation by Joint Identification-Verification," in Advances in Neural Information Processing Systems, 2014. 9 pages.
F. Schroff et al., "Facenet: A Unified Embedding for Face Recognition and Clustering," in Proceedings of the EEE Conference on Computer Vision and Pattern Recognition, 2015. 10 pages.
Y.D. Wen et al., "A Discriminative Feature Learning Approach for Deep Face Learning," in Proceedings of European Conference on Computer Vision, 2016. 17 pages.
W. Liu et al., "Sphereface: Deep Hypersphere Embedding for Face Recognition," in Proceedings of Conference on Computer Vision and Pattern Recognition (CVPR). IEEE, 2017, pp. 212-220. 9 pages.
H. Wang et al., "CosFace: Large Margin Cosine Loss for Deep Face Recognition," in Proceedings of Conference on Computer Vision and Pattern Recognition (CVPR). IEEE, 2018. 11 pages.
H. Liu et al., "A Discriminatively Learned Feature Embedding Based on Multi-Loss Fusion for Person Search," in Proceedings of International Conference on Acoustics, Speech and Signal Processing (ICASSP). IEEE, 2018. 5 pages.
A. Graves et al., "Connectionist Temporal Classification: Labelling Unsegmented Sequence Data with Recurrent Neural Networks," in Proceedings of the 23rd International Conference on Machine Learning. IEEE, 2006. 8 pages.
D. Povey et al., "Boosted Mmi for Model and Feature-Space Discriminative Training," in Proceedings of International Conference on Acoustics, Speech and Signal Processing (ICASSP). IEEE, 2008. 4 pages.
B. Kingsbury, "Lattice-Based Optimization of Sequence Classification Criteria for Neural Network Acoustic Modeling," in Proceedings of International Conference on Acoustics, Speech and Signal Processing (ICASSP). IEEE, 2009, pp. 3761-3764. 4 pages.
D. Povey et al., "Purely sequence-trained neural networks for ASR based on lattice-free MMI," in Proceedings of Conference of the International Speech Communication Association. IEEE, 2016. 5 pages.
J.B. Allen et al., "Image method for efficiently simulation room-small acoustic," Journal of the Acoustical Society of America, vol. 65, pp. 943-950, 1979. 8 pages.
K. Vesely et al., "Sequence-discriminative training of deep neural networks," in Interspeech, 2013. 5 pages.
H. Sak et al., "Sequence Discriminative Distributed Training of Long Short-Term Memory Recurrent Neural Networks," in Interspeech 2014, pp. 1209-1213, Sep. 18, 2014. 5 pages.

* cited by examiner

AUDIO RECOGNITION METHOD AND SYSTEM AND MACHINE DEVICE

RELATED APPLICATION(S)

This application is a continuation application of PCT Patent Application No. PCT/CN2020/072063, filed on Jan. 14, 2020, which claims priority to Chinese Patent Application No. 201910087286.4, entitled "AUDIO RECOGNITION METHOD AND SYSTEM AND MACHINE DEVICE" filed with the China National Intellectual Property Administration on Jan. 29, 2019, all of which are incorporated herein by reference in entirety.

FIELD OF THE TECHNOLOGY

The present disclosure relates to the field of computer acoustics application technologies, and in particular, to an audio recognition method and system and a machine device.

BACKGROUND

Implementation of audio recognition in acoustic scenarios, for example, the execution of various audio classification tasks, is often limited by the variability of the acoustic scenarios, such as automatic speech recognition based on the audio recognition, making it difficult to apply the audio recognition to various audio classification tasks. The variability of the acoustic scenarios comes from many aspects, for example, speakers, accents, background noise, reverberation, soundtracks, and recording conditions.

With the development of science and technology and the substantial improvement in hardware computing capabilities, the audio recognition may be implemented based on neural networks. However, the audio recognition implemented based on neural networks still may not achieve requisite robustness desirable in response to variable acoustic scenarios.

SUMMARY

To resolve the problem that a neural network for implementing audio recognition in related technologies lacks robustness to unseen and greatly varying acoustic conditions during training, the present disclosure provides a neural network training method and system for implementing audio recognition and a machine device.

In one aspect, the present disclosure provides an audio recognition method. The method includes: obtaining an audio data stream for audio recognition, the audio data stream including audio data respectively corresponding to a plurality of time frames; performing, for different audio data of each time frame in the audio data stream, feature extraction in each layer of a neural network, to obtain a depth feature outputted by a corresponding time frame; fusing, for a given label in labeling data, an inter-class confusion measurement index and an intra-class distance penalty value relative to the given label in a set loss function for the audio data stream through the depth feature; and obtaining, through fusion, a loss function value relative to a series of given labels in the labeling data, to obtain an audio labeling result for the audio data stream.

In another aspect, the present disclosure provides an audio recognition system. The audio recognition system includes a memory storing computer program instructions, and a processor coupled to the memory and configured to execute the computer program instructions to perform: obtaining an audio data stream for audio recognition, the audio data stream including audio data respectively corresponding to a plurality of time frames; performing, for different audio data of each time frame in the audio data stream, feature extraction in each layer of a neural network, to obtain a depth feature outputted by a corresponding time frame; fusing, for a given label in labeling data, an inter-class confusion measurement index and an intra-class distance penalty value relative to the given label in a set loss function for the audio data stream through the depth feature; and obtaining, through fusion, a loss function value relative to a series of given labels in the labeling data, to obtain an audio labeling result for the audio data stream.

In yet another aspect, the present disclosure provides a non-transitory computer-readable storage medium storing computer program instructions executable by at least one processor to perform: obtaining an audio data stream for neural network training of audio recognition, the audio data stream including audio data respectively corresponding to a plurality of time frames; performing, for different audio data of each time frame in the audio data stream, feature extraction in each layer of a trained neural network, to obtain a depth feature outputted by a corresponding time frame; fusing, for a given label in labeling data, an inter-class confusion measurement index and an intra-class distance penalty value relative to the given label in a set loss function for the audio data stream through the depth feature; and obtaining, through fusion, a loss function value relative to a series of given labels in the labeling data, to update a parameter in the neural network.

The technical solutions provided in the embodiments of the present disclosure may include the following beneficial effects:

In certain embodiments, and for given audio, an audio data stream is obtained for neural network training of audio recognition, the audio data stream including audio data respectively corresponding to a plurality of time frames. For different audio data of each time frame in the audio data stream, feature extraction is performed in each layer of a trained neural network, to obtain a depth feature outputted by a corresponding time frame, so that a depth feature used for labeling an audio data stream to recognize the audio data stream is obtained for different audio data of each time frame. On this basis, for a given label in labeling data, an inter-class confusion measurement index and a penalty for intra-class distance measurement relative to the given label are fused in a set loss function for the audio data stream through the depth feature. Finally, a parameter in the neural network is updated by using a loss function value obtained through fusion. For a neural network used for audio recognition, parameters of each layer of the network are updated based on the loss function value obtained through fusion, and the inter-class confusion measurement index and the intra-class distance penalty value of the audio data stream relative to the given label are integrated to improve the robustness of the implemented neural network to unseen and greatly varying acoustic conditions during training.

In certain embodiments, the inter-class confusion measurement index of the audio data stream relative to the given label ensures inter-class discrimination of the depth feature in audio recognition. The intra-class distance penalty value of the audio data stream relative to the given label, for audio recognition, enhances discrimination performance of a depth feature obtained by extraction. Therefore, the fusion between the two on this basis ensures that the depth feature is characterized by the inter-class discrimination and the tightness of intra-class distribution, thereby improving the robustness of the implemented neural network to unseen and greatly varying acoustic conditions during training, and further effectively improving the performance of audio recognition.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Exemplary embodiments are described in detail herein, in view of the accompanying drawings. When the following descriptions are made with reference to the accompanying drawings, unless otherwise indicated, same numbers in different accompanying drawings represent same or similar elements. The implementations described in the exemplary embodiments do not necessarily represent all implementations that are consistent with the present disclosure, and are rather mere examples of apparatuses and methods that are described in detail in the appended claims and that are consistent with some aspects of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
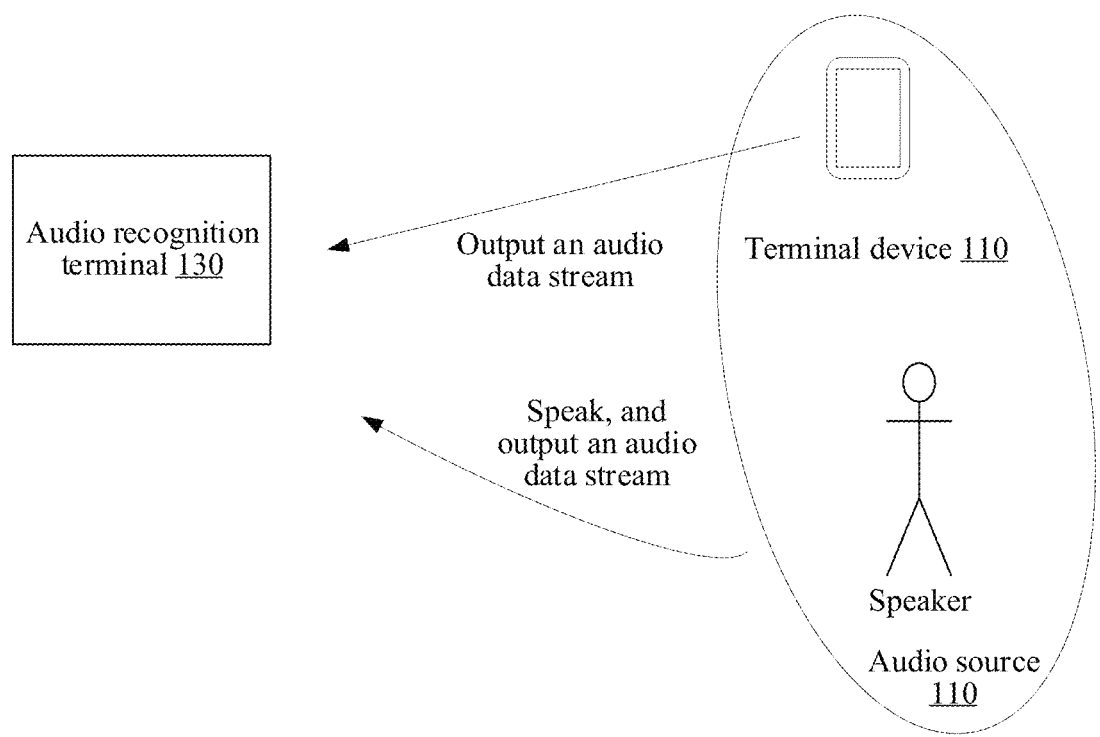
FIG. 1 is a schematic diagram of an implementation environment according to one or more embodiments of the present disclosure.

FIG. 1 is a schematic diagram of an implementation environment according to the present disclosure. In an exemplary embodiment, the implementation environment includes an audio source 110 and an audio recognition terminal 130. For audio, for example, a piece of speech, emitted by the audio source 110, the training of a neural network is performed on the audio recognition terminal 130, to obtain a neural network for implementing audio recognition.

For example, as shown in FIG. 1, the audio source 110 may be a speaker or may be a terminal device. The speaker speaks to output a piece of speech to the audio recognition terminal 130, or the terminal device plays audio to output a piece of audio to the audio recognition terminal 130.

The audio recognition terminal 130 may be a smart speaker, a smart TV, an online speech recognition system, or the like. For a training process of the neural network, the audio source 110 provides an audio data stream as training data for the neural network training. Neural network training logic for implementing audio recognition in the present disclosure is applicable to the audio recognition terminal 130, to perform neural network training on audio inputted by the audio source 110. It is to be understood that, a specific framework of the implementation environment is strongly related to implementation scenarios. In different scenarios, the implementation environment has different architecture deployments apart from the audio source 110 and the audio recognition terminal 130.

The audio recognition terminal 130 is oriented to various audio sources 110. For example, devices with various applications provide, by using various audio sources 110, the audio recognition terminal 130 with audio data streams for neural network training.

A neural network obtained through training is applicable to many scenarios, for example, audio monitoring, speaker recognition, and human-computer interaction in security surveillance, which are not listed herein, to implement audio recognition in many scenarios.

Figure 2:
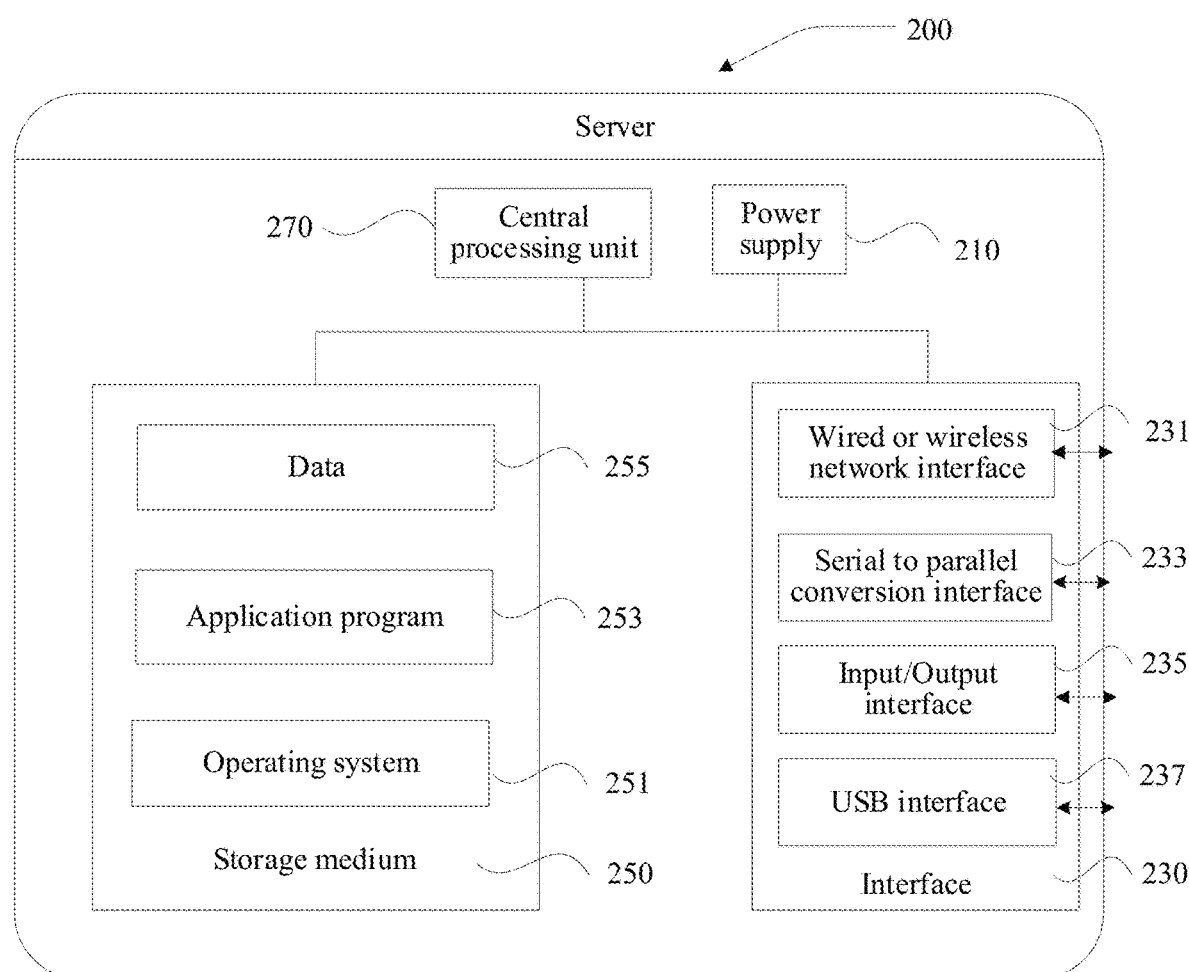
FIG. 2 is a schematic structural block diagram of hardware of an audio recognition terminal according to one or more embodiments of the present disclosure.

FIG. 2 is a structural block diagram of hardware of an audio recognition terminal according to an exemplary embodiment. In an exemplary embodiment, the audio recognition terminal may be a server, and may alternatively be a terminal device with excellent computing capabilities. FIG. 2 is a structural block diagram of hardware of a server as an audio recognition terminal according to an exemplary embodiment. A server 200 is merely an example adapted to the present disclosure, and is not intended to impart any unwanted limitation to a use range of the present disclosure.

Moreover, the server 200 does not necessarily need to reply on must include any of the components described of the exemplary server 200 shown in FIG. 2.

The hardware structure of the server 200 may vary greatly because of differences in configuration or performance. As shown in FIG. 2, the server 200 includes a power supply 210, an interface 230, at least one storage medium 250, and at least one central processing unit (CPU) 270.

The power supply 210 is configured to provide a working voltage for hardware devices on the server 200.

The interface 230 includes at least one wired or wireless network interface 231, at least one serial-to-parallel conversion interface 233, at least one input/output interface 235, at least one USB interface 237, and the like, and is configured to communicate with an external device.

The storage medium 250, serving as a carrier of resource storage, may be a random storage medium, a magnetic disk, an optical disc, or the like. Resources stored thereon include an operating system 251, an application program 253, data 255, and the like. A storage manner may be transient storage or permanent storage. The operating system 251 is configured to manage and control various hardware devices on the server 200 and the application program 253, to implement the computation and processing of the massive data 255 by the CPU 270. The operating system may be Windows Server™, Mac OS X™, Unix™, Linux™, FreeBSD™ or the like. The application program 253 is a computer program that performs at least one specific work based on the operating system 251, and may include at least one module (not shown in FIG. 2). Each module may include a series of operation instructions for the server 200. The data 255 may be photos, pictures, and the like stored in the disk.

The central processing unit 270 may include one or more processors, and is configured to communicate with the storage medium 250 by using a bus, and perform an operation on and process the massive data 255 in the storage medium 250.

As described in detail above, the server 200 suitable for the present disclosure reads the forms of a series of operation instructions stored in the storage medium 250 by using the CPU 270 to perform audio recognition.

Figure 3:
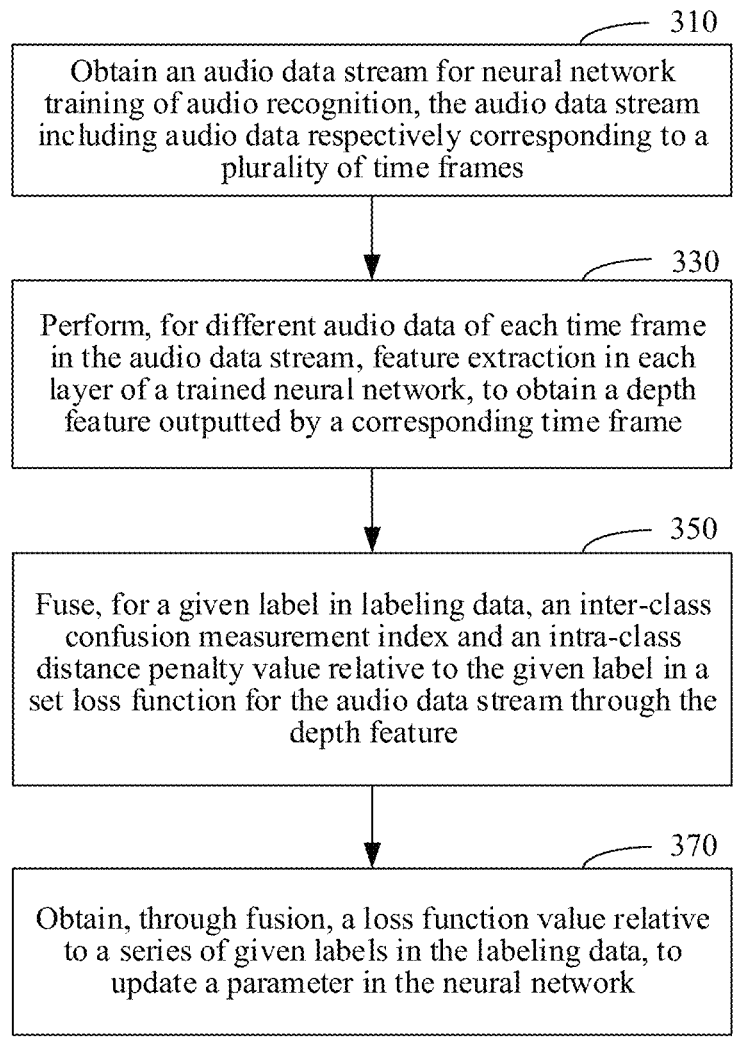
FIG. 3 is a schematic flowchart of a neural network training method for implementing audio recognition according to one or more embodiments of the present disclosure.

FIG. 3 is a schematic flowchart of a neural network training method for implementing audio recognition according to one or more embodiments of the present disclosure. In an exemplary embodiment, the neural network training method for implementing audio recognition, as shown in FIG. 3, includes at least the following steps:

Step 310. Obtain an audio data stream for neural network training of audio recognition, the audio data stream including audio data respectively corresponding to a plurality of time frames.

Before a neural network for implementing audio recognition is trained, an audio data stream corresponding to the audio may be obtained first, so that the audio data stream may be used to perform a training process of the neural network subsequently. It is to be understood that the audio data stream describes audio content and reflects a speaker who outputs the audio content. The audio data stream is formed by frames of audio data. Therefore, the audio data stream includes a plurality of pieces of audio data respectively corresponding to the plurality of time frames. Such audio data forms a time sequence, that is, the audio data stream corresponds to audio sequence data formed in a particular time sequence.

In an exemplary embodiment, step 310 includes: obtaining a noisy and continuous audio data stream and training data with the neural network as labeling data.

The audio recognition may include classifying audio data streams. That is, audio labeling is performed on the audio data stream in an audio recognition process, so that the audio labeling indicates a category to which the audio data stream belongs. Therefore, a speaker corresponding to the audio data stream or a label to which the audio data stream belongs in content may be learned based on the audio labeling subsequently. Based on this, it can be learned that in a process of training a neural network for implementing audio recognition, an audio data stream and labeling data corresponding to the audio data stream are used as training data, so that the labeling data and the audio data stream are in cooperation to train the neural network.

In an exemplary embodiment, for the obtained audio data stream, before step 330 is performed, the audio recognition method further includes the following step: performing framing on the audio data stream, to obtain audio data corresponding to a plurality of time frames, audio recognition being performed on the audio data corresponding to the time frames through prediction of corresponding audio labeling.

The audio data stream is usually of any length and is labeled, for example, may be a short input speech, or may be an ongoing lecture. Therefore, framing may be performed on the audio data stream for audio recognition according to a particular frame length and frame shift, to obtain audio data corresponding to each time frame. A given label in the labeling data corresponds to a piece of audio data corresponding to a time frame.

The audio recognition implemented by the neural network is a type of time sequence classification. The audio data obtained by framing forms time sequence data in the time sequence classification. Subsequent feature extraction is performed on the audio data in a time sequence, to output features for audio data in each time frame.

The process of audio recognition is a prediction process of audio labeling. A category of the audio data stream where the audio data is located is predicted, and is then labeled with a corresponding label, which may be alternatively referred to as a label, to obtain an audio labeling result. The audio labeling result is used to determine the corresponding speaker or a category of the audio in content. The training of the neural network corresponds to this. Therefore, a labeled audio data stream is employed for neural network training.

Step 330. Perform, for one or more pieces of audio data respectively of one or more of the plurality of time frames in the audio data stream, feature extraction in each layer of a trained neural network, to obtain a depth feature outputted by a corresponding time frame.

For the audio data stream, feature extraction is performed on different audio data in each time frame. The feature extraction is performed in a neural network. The feature extraction is performed in each layer of the neural network to obtain a depth feature corresponding to a time frame.

The neural network for feature extraction of audio data may be applied to a variety of model types and network topologies, or may extend the network structure as needed, or even replace various more effective network topologies. In an exemplary embodiment, the neural network may output depth features for audio data in different time frames by using a multi-layer structure including a convolutional network layer and a Max pool layer, a multi-layer structure of long short-term memory (LSTM), and a fully connected layer.

A depth feature outputted by a corresponding time frame is a numerical description of the audio data. Therefore, the audio data stream is labeled to represent the audio data.

In an exemplary embodiment, step 330 includes: performing, for different audio data of each time frame in the audio data stream, feature extraction in each layer of a neural network layer by layer until the last layer of the network is reached, to obtain a depth feature outputted by a corresponding time frame.

The audio data of each time frame in the audio data stream performs extraction of the depth feature in the neural network through each layer of the network, to obtain features in the unit of frame.

Figure 4:
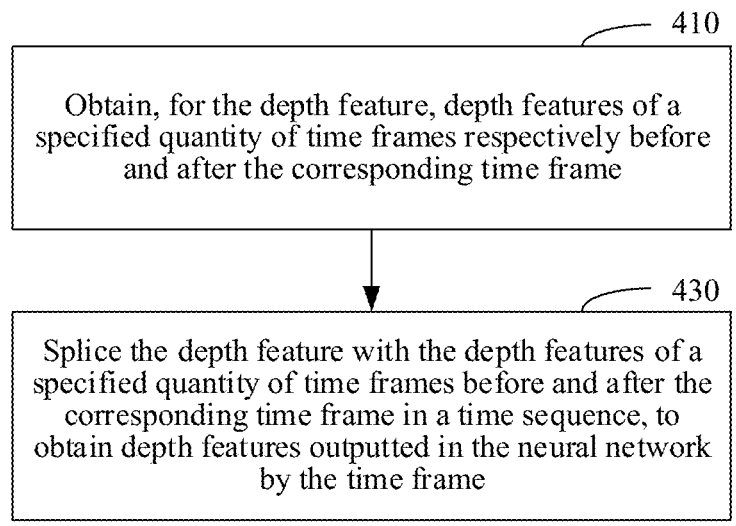
FIG. 4 is a schematic flowchart of an audio recognition method according to one or more embodiments of the present disclosure.

In another exemplary embodiment, for the depth feature of the corresponding time frame obtained in step 330, before step 350 is performed, as shown in FIG. 4, the audio recognition method further includes the following steps:

Step 410. Obtain, for the depth feature, depth features of a specified quantity of time frames respectively before and after the corresponding time frame.

In the foregoing exemplary embodiment, the obtained depth feature is obtained by extracting audio data of a time frame. In this exemplary embodiment, depth features are spliced according to a particular length for this time frame for use as a depth feature outputted by this time frame.

In certain embodiments, the term "splice" or "spliced" may alternatively refer to an action of combining or integrating and/or a state of being combined or integrated.

Based on this, for a depth feature corresponding to each time frame, depth features of a given quantity or a specified quantity of time frames respectively before and after the time frame are obtained. For example, the specified quantity of time frames may be 5, and depth features of audio data of five frames respectively before and after the time frame are then obtained.

Step 430. Splice the depth feature with the depth features of a specified quantity of time frames before and after the corresponding time frame in a time sequence, to obtain depth features outputted in the neural network by the time frame.

After obtaining the depth features of a specified quantity of time frames for the time frame by performing step 410, the depth features are spliced in a time sequence according to the time frames corresponding to the obtained depth features, to obtain the depth features outputted in the neural network by the current time frame.

It is to be understood that framing is performed on the audio data stream to obtain the audio data corresponding to a plurality of time frames. Each piece of audio data describes a part of content in the audio data stream. The feature extraction is performed on all audio data to classify and recognize audio data streams.

For an audio data stream requesting neural network training, through the foregoing exemplary embodiment, according to a hardware deployment of an audio recognition terminal, the audio data stream is divided according to a particular length of time, to obtain audio data corresponding to a plurality of time frames, thereby adapting to any audio recognition condition and machine deployment condition, and enhancing the reliability and versatility of the neural network.

For different audio data corresponding to a plurality of time frames, depth features are spliced for a current corresponding time frame according to a specified quantity of time frames, to obtain depth features that can reflect context information, thereby enhancing the accuracy of the neural network.

For the splicing of the depth features, the current time frame is a time frame currently processed in the splicing of the depth features. The splicing of the depth features is performed for each time frame. For each time frame, depth features before and after the time frame are spliced for a corresponding depth feature, to obtain depth features outputted by the time frame.

Step 350. Fuse, for a given label in labeling data, an inter-class confusion measurement index and an intra-class distance penalty value relative to the given label in a set loss function for the audio data stream through the depth feature.

After the audio data of the time frame is extracted to obtain the depth feature, the depth feature is used to represent the audio data, to perform the neural network training that the audio data participates in.

The labeling data corresponds to the audio data stream. The labeling data is inputted for the training process of the neural network. The labeling data is used to provide all possible labels for the label prediction of the audio data stream. The calculation performed in step 350 is then used to determine a category corresponding to which label is relative to the inter-class confusion measurement index existing in the audio data stream, thereby determining the loss function value to perform an iterative training of the neural network.

The set loss function is used to use the depth feature as an input, to implement the fusion and calculation between the inter-class confusion measurement index and the intra-class distance penalty value of the audio data stream relative to the given label. That is, the set loss function is a fusion loss function. The loss function value is provided for the training of the neural network under the action of the set loss function.

The labeling data includes a plurality of given labels. For each given label, an inter-class confusion measurement index and an intra-class distance penalty value relative to the given label are fused in a set loss function for the audio data stream through the depth feature, to obtain a loss function value of the given label. The loss function value determines whether the current iterative training of the neural network has finished converging.

In certain embodiments, and for the loss function value calculated by using the set loss function, the neural network training is controlled by minimizing the loss function value, to ensure that the iterative training of the neural network can converge to finish, thereby updating the obtained parameters to the neural network.

A neural network obtained through training corresponds to a minimum loss function value that is obtained by fusing the inter-class confusion measurement index and the intra-class distance penalty value. Therefore, the inter-class confusion measurement index and the intra-class distance penalty value are both minimized.

Each given label corresponds to or represents a category, and the given label exists as a label of the corresponding category. The inter-class confusion measurement index of the audio data stream relative to the given label is used to represent a possibility that the audio data stream belongs to the category corresponding to the given label, to enhance inter-class discrimination, that is, a smaller inter-class confusion measurement index indicates stronger inter-class discrimination. The intra-class distance penalty value of the audio data stream relative to the given label is used to enhance the discrimination performance by a penalty of intra-class distance, to satisfy the intra-class discrimination performance through compact intra-class distribution, that is, a smaller intra-class distance penalty value indicates more compact intra-class distribution, thereby enhancing the intra-class discrimination performance.

In an exemplary embodiment, the obtained inter-class confusion measurement index and intra-class distance penalty value relative to the given label are oriented to audio data of a time frame. For audio data of each time frame, fusion between an inter-class confusion measurement index and an intra-class distance penalty value of the audio data relative to a given label is implemented through a depth feature thereof.

In another exemplary embodiment, the obtained inter-class confusion measurement index and intra-class distance penalty value of the given label are oriented to an entire audio data stream. For each given label in the labeling data, the fusion between the inter-class confusion measurement index and the intra-class distance penalty value of the audio data stream relative to the current given label is performed on the entire audio data stream.

In this exemplary embodiment, the entire audio data stream is labeled to obtain a label sequence. The obtained loss function value is a probability that the audio data stream is relative to a possible label sequence. The value of the probability is determined by an inter-class confusion measurement index and an intra-class distance penalty value of the audio data stream relative to the label sequence.

As a result, the labeling of a single piece of audio data may be optimized as the prediction of all possible label sequences by the audio data stream, so that it is no longer necessary to ensure the frame-level labeling in the training of the neural network, it is not necessary to provide a corresponding label to the audio data of each time frame in the training process, and it is not necessary to ensure that the length of an input signal stream of the training process is consistent with that of the label. For a piece of audio, it may be acceptable that audio data of one or more time frames have no corresponding labels. The labeling of audio data on a current time frame can usually be performed after several time frames. Therefore, the labeling is performed on the entire audio data stream, so that the implementation of audio recognition no longer requires frame-level labeling in the training process, a mechanism of sequence modeling can be supported and used, and discriminative feature expression can be learned during sequence discrimination training.

As described above, the feature extraction is performed in each layer of the neural network, to obtain the depth feature of the audio data of the time frame. In addition, for the neural network, a softmax layer is further included. A result is outputted through the softmax layer. In certain embodiments, the outputted result is a probability distribution of the audio data stream relative to each given label, that is, the foregoing loss function value, to optimize the neural network by using the minimum loss function value.

Therefore, the implementation of step 350 is performed by using the softmax layer in the neural network, to further obtain the loss function value of the audio data stream relative to a series of given labels in the labeling data.

For the softmax layer in the neural network, the fusion between the inter-class confusion measurement index and the intra-class distance penalty value of the audio data stream relative to the given label is implemented by a set fusion loss function.

The intra-class distance penalty value may be calculated by using Euclidean distance, or may be calculated by using other distance types, for example, angular distance. Correspondingly, the calculating an intra-class distance penalty value may be implemented by using a center loss function, but is not limited thereto. The intra-class distance penalty value may be alternatively calculated by using Contrastive loss function, Triplet loss function, Sphere face loss function, CosFace loss function, and the like that use angular distance, which are not listed one by one herein.

Step 370. Obtain, through fusion, a loss function value relative to a series of given labels in the labeling data, to update a parameter in the neural network.

After step 350 is performed to obtain the loss function value of the audio data stream relative to a series of given labels in the labeling data, the loss function value may be used to control the training of the neural network.

The series of given labels are all given labels corresponding to the loss function value outputted by the audio data stream through the softmax layer. In an exemplary embodiment, the audio data stream is fused to obtain a series of given labels corresponding to the loss function value that include given labels mapped through the softmax layer of the audio data corresponding to each time frame. In another exemplary embodiment, the audio data stream is fused to obtain a series of given labels corresponding to the loss function value, and the series of given labels are given labels mapped through the softmax layer by the audio data stream.

Through this exemplary embodiment, the error rate of audio recognition under unseen acoustic conditions is significantly reduced, the generalization ability of audio recognition to noise variability is effectively improved, and very low error rates can be obtained under clean speech conditions, and under seen acoustic conditions and unseen acoustic conditions during training.

Figure 5:
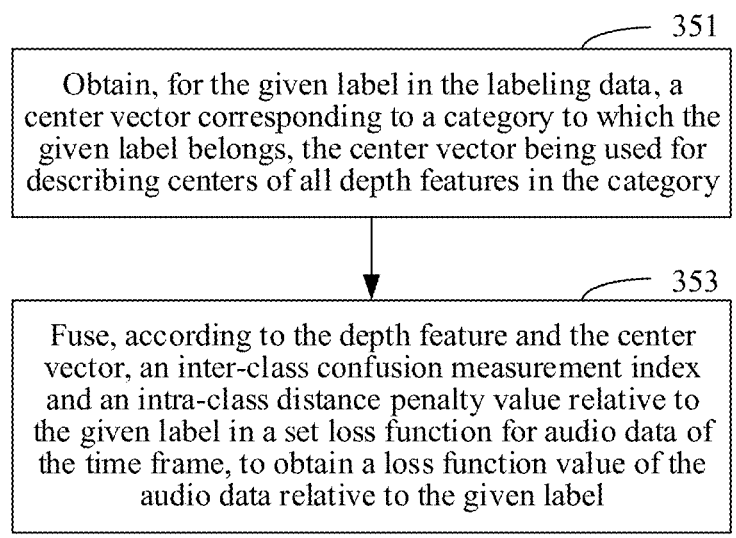
FIG. 5 is a schematic flowchart of describing step 350 referenced in FIG. 3 according to one or more embodiments of the present disclosure.

FIG. 5 is a flowchart of describing step 350 according to the embodiment corresponding to FIG. 3. In an exemplary embodiment, as shown in FIG. 5, step 350 includes the following steps:

Step 351. Obtain, for the given label in the labeling data, a center vector corresponding to a category to which the given label belongs, the center vector being used for describing centers of all depth features in the category.

Step 353. Fuse, according to the depth feature and the center vector, an inter-class confusion measurement index and an intra-class distance penalty value relative to the given label in a set loss function for audio data of the time frame, to obtain a loss function value of the audio data relative to the given label.

This exemplary embodiment is fusion and calculation for the audio data. The loss function value of the audio data of each time frame relative to the given label is obtained by using the set loss function.

As described above, the labeling data includes a plurality of given labels. Therefore, in the calculation of the intra-class distance penalty value by using Euclidean distance, an intra-class distance is calculated for the depth feature according to the center vector of the category to which the given label belongs, and the intra-class distance penalty value is then obtained by penalizing the intra-class distance. In certain embodiments, the center vector is used for describing a center of the category to which the given label belongs. In the fusion and calculation performed in the softmax layer of the neural network, for the audio data of each time frame, the intra-class distance penalty value relative to the given label is calculated based on the center vector for each given label in the labeling data.

Correspondingly, for the given label, the inter-class confusion measurement index of the audio data of each time frame relative to each given label is predicted.

It can be learned that the fusion and calculation are performed for each given label in the labeling data, and in the fusion and calculation performed in the set loss function, for the same given label, the inter-class confusion measurement index and the intra-class distance penalty value relative to the given label are calculated, and are then fused to obtain the loss function value of the audio data relative to the given label, and the like, to obtain through calculation loss function values of the audio data of each time frame relative to all given labels.

Through this exemplary embodiment, the labeling of audio data can be robust under new acoustic conditions, and audio recognition can be performed stably and reliably even in the case of a new recording environment, a new speaker, or a new accent and new background noise.

In another exemplary embodiment, step 353 includes: calculating a center loss of the given label by using the depth feature and the center vector, to obtain an intra-class distance penalty value of the audio data of the time frame relative to the given label.

As pointed out above, the center vector corresponding to the given label is used as the center of the category. The audio data of each time frame uses the depth feature extracted from the audio data to calculate the intra-class compactness and the discrimination performance of the depth feature in the corresponding category for the center vector, which is implemented by penalizing the intra-class distance between the depth feature and the center vector.

Therefore, in an exemplary embodiment, the calculating a center loss of the audio data relative to the given label may be implemented by using the center loss function shown below:

$$L_{cl} = \sum_{t} \|u_t - c_{k_t}\|_2^2,$$

where $L_{cl}$ is an intra-class distance penalty value, $u_t$ is a depth feature of audio data of a time frame t, that is, an output of the penultimate layer in the neural network at the time frame t, and $c_{k_t}$ is a center vector of a $k_t$ depth feature.

Calculation of the center loss is performed such that a sum of squares of a distance between the depth feature of the audio data and the center is to be as small as possible, that is, the intra-class distance is as small as possible.

In another exemplary embodiment, step 353 further includes: calculating, according to the depth feature, an inter-class confusion measurement index of the audio data of the time frame relative to the given label by using a cross-entropy loss function.

The cross-entropy loss function is used to ensure the inter-class discrimination of depth features.

In an exemplary embodiment, the cross-entropy loss function is:

$$L_{ce} = -\sum_{t} \log y_t^{k_t},$$

where $L_{ce}$ is an inter-class confusion measurement index of the audio data belonging to the given label at the time frame t, and $y_t^{k_t}$ is an output of a corresponding $k_t$ node after a softmax operation of a neural network output layer. There are K output nodes in the neural network that represent a K output category.

Further, $y_t^{k_t}$ is obtained by using the following formula:

$$y_t^{k_t} = \frac{e^{a_t^{k_t}}}{\sum_{j=1}^{K} e^{a_t^j}},$$

where $a_t$ is an output of the corresponding time frame t in the last layer of the neural network, that is, the previous layer of the softmax layer, $a_t$ represents a j node, and W and B respectively correspond to a weight matrix and a bias vector of the last layer.

In another exemplary embodiment, step 353 further includes: performing weighting calculation on the intra-class distance penalty value and the inter-class confusion measurement index of the audio data relative to the given label in the set loss function according to a specified weighting factor, to obtain the loss function value of the audio data relative to the given label.

The fusion and calculation are weighting calculation between the two in the set loss function according to the specified weighting factor, to obtain the loss function value of the audio data relative to the given label.

In an exemplary embodiment, as the set loss function, the fusion loss function is used to perform the fusion and calculation on the center loss function and the cross-entropy loss function by using the following fusion loss function:

$$L_{finf} = L_{ce} + \lambda L_{cl},$$

where $L_{finf}$ is a loss function value of audio data relative to a given label, and $\lambda$ is a specified weighting factor.

In an exemplary embodiment, audio data of different time frames in the audio data stream is labeled through the given label in the labeling data.

As pointed out above, the audio data stream includes different pieces of audio data respectively corresponding to the plurality of time frames. The audio data of each time frame is labeled, and there are corresponding given labels in the labeling data.

That is, the given labels in the labeling data correspond to the audio data of different time frames in the audio data stream, to achieve an alignment between the labeling data and the audio data stream in the neural network training.

Figure 6:
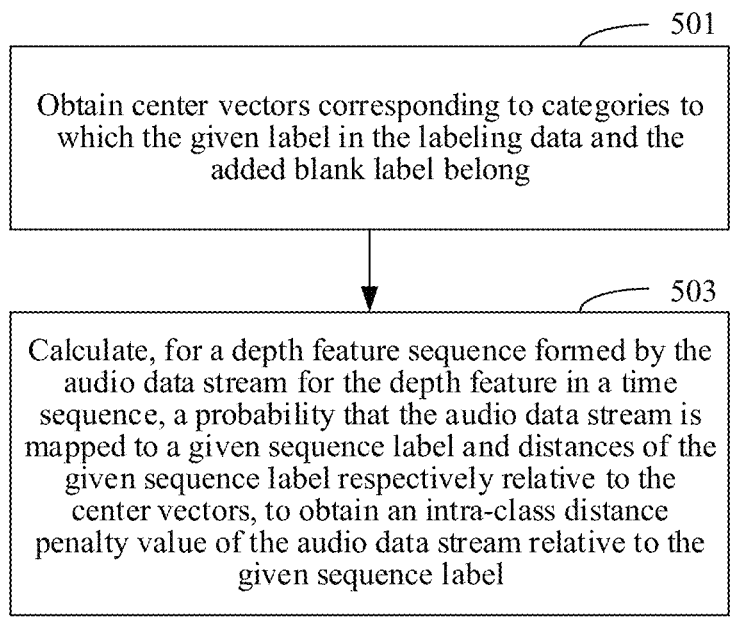
FIG. 6 is a schematic flowchart of describing step 350 referenced in FIG. 3 according to one or more embodiments of the present disclosure.

FIG. 6 is a flowchart of describing step 350 in another exemplary embodiment according to the embodiment corresponding to FIG. 3. In another exemplary embodiment, a blank label is added to the labeling data. As shown in FIG. 6, step 350 includes the following steps:

Step 501. Obtain center vectors corresponding to categories to which the given label in the labeling data and the added blank label belong.

Step 503. Calculate, for a depth feature sequence formed by the audio data stream for the depth feature in a time sequence, a probability that the audio data stream is mapped to a given sequence label and distances of the given sequence label respectively relative to the center vectors, to obtain an intra-class distance penalty value of the audio data stream relative to the given sequence label, where the given sequence label includes the added blank label and the given label.

The blank label is a newly added label in the labeling data, and the blank label corresponds to a "blank category". In certain embodiments, and in the audio data stream, there is usually audio data of a time frame or several time frames corresponding to an unknown given label. Therefore, the audio data may belong to the blank label, so that the alignment of the audio data stream and the given sequence label is ensured, the problem that the length of the audio data stream is inconsistent with that of the label is resolved, and the audio recognition is no longer limited by the frame-level labeling data.

In certain embodiments, and for the audio data stream, blank labels exist in given labels to which the audio data stream belongs, that is, the blank labels separate the given labels.

The given sequence label includes a plurality of given labels and blank labels inserted between the given labels. In addition, in the given sequence label, blank labels are inserted at the head and tail to resolve the problem that the first frame of audio data and the last frame of audio data in the audio data stream have no meaning and therefore cannot be labeled.

Therefore, in an exemplary embodiment, the labeling data of the audio data stream is an unaligned discrete label string, a blank label is added to the discrete label string, and the added blank label and the given label in the labeling data respectively correspond to audio data of different time frames in the audio data stream.

The unaligned discrete label string of the audio data stream is a given sequence label. Therefore, the discrete label string includes a plurality of given labels. However, each frame of the input signal stream cannot correspond to each given label. That is, it is unknown which frames of the input signal stream a given label in the discrete label string corresponds to.

The audio data stream and the unaligned discrete label string are used as training data to train the neural network, so that the training of the neural network and the implementation of subsequent audio recognition are no longer limited to the frame-level labeling data, that is, no longer limited to the failure of alignment between the input signal stream and the discrete label string.

The intra-class distance penalty value of the audio data stream relative to the given sequence label obtained by calculating the center loss is an expected value of a distance by which the depth feature deviates from the center vector in the audio data stream for the given sequence label. A given label sequence is a label sequence that the audio data stream may correspond to, and includes the given label and the blank label.

The probability that the audio data stream is mapped to the given sequence label is calculated relative to each possible given sequence label, and is used to describe a mapping relationship between the audio data stream and the given sequence label.

In an exemplary embodiment, the probability that the audio data stream is mapped to the given sequence label may be calculated by using the conditional probability distribution shown below:

$$p(s,t|z) = \alpha_t(s)\beta_t(s)$$

where $\alpha_t(s)$ and $\beta_t(s)$ respectively represent a forward variable and a backward variable, and may be calculated according to a maximum likelihood criterion in connectionist temporal classification (CTC). z is a sequence label of a length r.

Because the given sequence label is essentially obtained by inserting a sequence label z into a blank label, the calculation of the probability that the audio data stream is mapped to the given sequence label for the given sequence label is essentially performed on the sequence label z.

Correspondingly, the intra-class distance penalty value of the audio data stream relative to the given sequence label is calculated by using the following condition expected center loss function:

$$L_{ecl} = \sum_s \sum_t p(s,t|z)\|u_t - c_{z'_s}\|_2^2,$$

where $L_{ecl}$ is the intra-class distance penalty value of the audio data stream relative to the given sequence label, z' is a given sequence label obtained after inserting blank labels at the head and tail of the sequence label z and between adjacent given labels, $c_{z'_s}$ is a center vector of a corresponding category in the given sequence label, and S is a training set where a label pair of the audio data stream x and a sequence label z are located.

In the fusion and calculation for the audio data stream, the probability that the audio data stream is mapped to the given sequence label and distances of the given sequence label respectively relative to the center vectors are performed, to perform the calculation of the condition expected center loss function, and obtain the intra-class distance penalty value of the audio data stream relative to the given sequence label. Each possible label sequence that may be formed by a given label and a blank label in the labeling data is used as a given sequence label to participate in the calculation.

In another exemplary embodiment, step 350 includes: calculating a probability distribution of the audio data stream relative to the given sequence label according to the depth feature, and calculating a log-likelihood cost of the audio data stream through the probability distribution as an inter-class confusion measurement index of the audio data stream relative to the given sequence label.

With the calculation of the intra-class distance penalty value of the audio data stream relative to the given sequence label, the calculation of the inter-class confusion measurement index of the audio data stream relative to the given sequence label is also performed for the audio data stream. The calculation of the inter-class confusion measurement index of the audio data stream relative to the given sequence label is to maximize a probability that the given label sequence is a correct label relative to the audio data stream. The probabilities of all correct labels are maximized, that is, a log-likelihood cost of the probability distribution of the audio data stream relative to the given sequence label is minimized.

In an exemplary embodiment, the probability distribution of the audio data stream relative to the given sequence label may be calculated by using the following formula:

$$p(z|x).$$

The log-likelihood cost of the audio data stream may then be calculated by using the probability distribution as follows:

$$L_{ml} = -\sum_{(x,z)\in S} \ln(p(z|x)),$$

where $L_{ml}$ is the inter-class confusion measurement index of the audio data stream relative to the given sequence label, that is, the log-likelihood cost of the audio data stream.

In another exemplary embodiment, step 350 further includes: performing weighting calculation on the inter-class confusion measurement index and the intra-class distance penalty value of the audio data stream relative to the given sequence label in the set loss function according to a specified weighting factor, to obtain a loss function value of the audio data stream relative to the given sequence label.

Based on the foregoing inter-class confusion measurement index and intra-class distance penalty value of the audio data stream relative to the given sequence label, the fusion and calculation are performed between the two, that is, the weighting calculation is performed between the two according to the specified weighting factor, to obtain the loss function value of the audio data stream relative to the given sequence label.

In an exemplary embodiment, it is determined according to the minimum loss function value that the neural network training has finished converging. Therefore, correspondingly, the weighting calculation is performed according to the specified weighting factor on the audio data stream relative to each given sequence label, and a parameter corresponding to the minimum loss function value may be updated to the neural network.

In an exemplary embodiment, the loss function value of the audio data stream relative to the given sequence label is calculated by using the following temporal multi-loss fusion function:

$$L_{tmf}=L_{ml}+_{ecl},$$

where $L_{tmf}$ is a loss function value of an audio data stream relative to a given sequence label, and λ is a specified weighting factor.

Through the temporal multi-loss fusion function, the inter-class discrimination of depth features can be ensured, and the condition expected center loss function improves the intra-class distribution compactness of depth features, that is, to ensure the discrimination performance.

Figure 7:
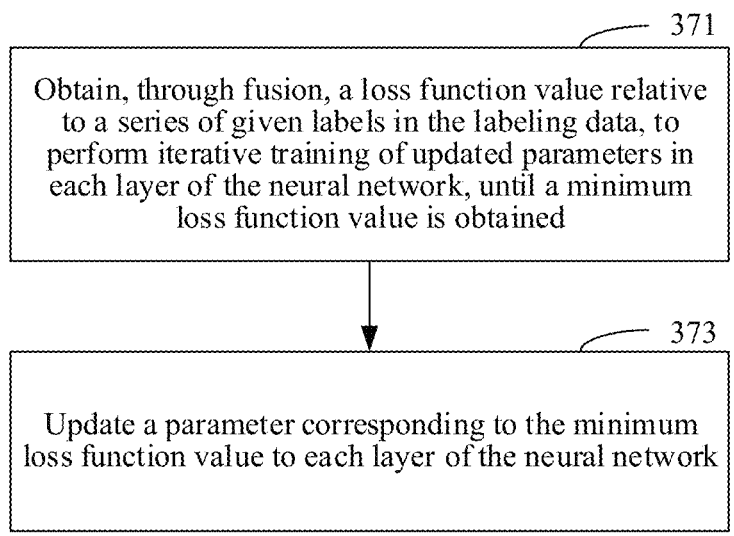
FIG. 7 is a schematic flowchart of describing step 370 referenced in FIG. 3 according to one or more embodiments of the present disclosure.

FIG. 7 is a flowchart of describing step 370 according to the embodiment corresponding to FIG. 3. In an exemplary embodiment, as shown in FIG. 7, step 370 includes the following steps:

Step 371. Obtain, through fusion, a loss function value relative to a series of given labels in the labeling data, to perform iterative training of updated parameters in each layer of the neural network, until a minimum loss function value is obtained.

Step 373. Update a parameter corresponding to the minimum loss function value to each layer of the neural network.

The neural network that implements audio recognition and is robust is obtained by training through a noisy and continuous audio data stream. Under the action of the audio data stream and the fusion loss function, the neural network obtained by training usually covers a variety of different acoustic conditions, and the neural network obtained through training can adapt to various different acoustic conditions and have better reliability and stability.

In the process of training through each layer of the neural network, weight parameters of each layer of the network are optimized according to the minimum loss function value, to obtain a neural network that is robust to unseen acoustic conditions. That is, in an exemplary embodiment, the training of the neural network is performed with a set minimum loss function as a training target, thereby implementing the label prediction of the audio data stream through the neural network.

In the training of the neural network, the audio data stream is passed forward until an error signal is outputted and generated, and error information is propagated backward to update parameters, such as a weight matrix of each layer of the network, and parameters of the softmax layer, to perform the training of the multilayer neural network, which is then applied to audio classification tasks.

For example, the temporal multi-loss function used in the softmax layer is also differentiable. Therefore, a backward propagation algorithm of a neural network standard is used for training.

Through this exemplary embodiment, the neural network obtained through training is continuously optimized, and the accuracy of audio recognition by the neural network is continuously enhanced.

Through the exemplary embodiment as described above, various applications such as automatic speech recognition are implemented under various acoustic conditions, for example, clean speech conditions, and seen acoustic conditions and unseen acoustic conditions during training, and a very low word error rate can be obtained. In addition, the word error rate reduction brought about through the foregoing exemplary embodiment under the unseen acoustic conditions is the most significant among all acoustic conditions. This all strongly indicates that the foregoing exemplary embodiment can effectively improve the robustness, and while ensuring both the inter-class discrimination and the intra-class distribution compactness of depth features, the generalization ability to noise variability can be effectively improved.

The training implementation of the foregoing exemplary embodiment is applicable to neural networks of various network structures, that is, the model type and network structure of the neural network are not limited, and may be replaced with various effective new network structures. The softmax layer is constructed for the used neural network. No complexity is added additionally, no targeted extra hyperparameter or network structure tuning is employed, and the consistency performance is improved.

The foregoing exemplary embodiment may be applied to a plurality of projects and product applications including smart speakers, smart TVs, online speech recognition systems, smart speech assistants, simultaneous interpretation, and virtual people. The accuracy is significantly improved in a complex and highly varying real acoustic environment, and the performance is greatly improved.

With reference to the implementation of the foregoing method, description is made by using an example in which an automatic speech recognition system is implemented. As an application of audio recognition, the automatic speech recognition system trains an inputted audio data stream to obtain a neural network. In one aspect, the existing automatic speech recognition is not applicable to all possible acoustic conditions and varying acoustic conditions, which is caused by that the used neural network cannot cover all acoustic conditions during training. In another aspect, when the neural network is trained, each sample frame may need to be provided with a corresponding category label, which, however, cannot be satisfied for an actual training process of the neural network. The training data that can be used is the noisy and continuous audio data stream and the unaligned discrete label sequence. It is unknown which frames of the input signal stream correspond to a particular label.

Therefore, the foregoing method is used to perform automatic speech recognition. After the inter-class confusion measurement index and the intra-class distance penalty value of the audio data stream relative to the given label are fused through the depth feature in each layer of the neural network, to obtain the loss function value of a series of given labels in the audio data stream relative to the labeling data, and perform the training of the neural network.

Figure 8:
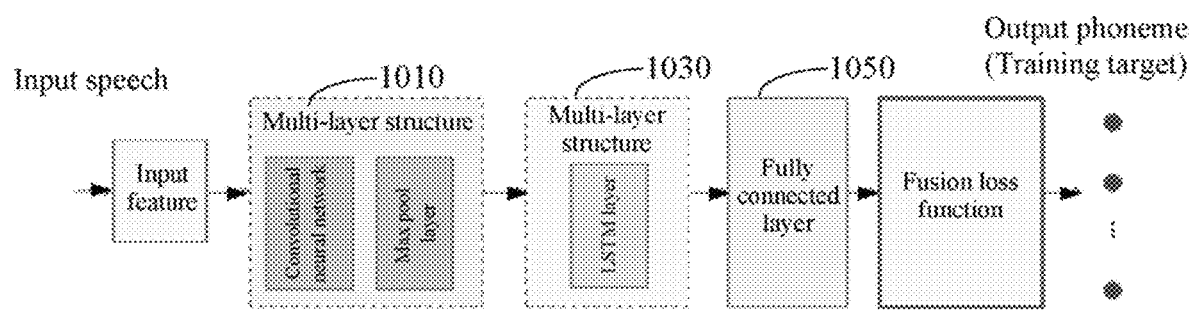
FIG. 8 is a schematic diagram of a network architecture of a neural network in an automatic speech recognition system according to one or more embodiments of the present disclosure.

FIG. 8 is a schematic diagram of a network architecture of a neural network in an automatic speech recognition system according to an exemplary embodiment. In an exemplary embodiment, as shown in FIG. 8, a network architecture of the neural network to which the automatic speech recognition system belongs in the present disclosure includes at least a multi-layer structure 1010 of a convolutional network layer and a Max pool layer, a multi-layer structure 1030 of LSTM, a fully connected layer 1050, and a fusion loss function calculation module. Correspondingly, an input feature obtained through a feature extraction module by the audio data stream passes through the multi-layer structure 1010 of a convolutional network layer and a Max pool layer, then passes through the multi-layer structure 1030 of LSTM, then passes through the fully connected layer 1050, and is then outputted to the fusion loss function calculation module. The neural network training is performed through a fusion loss function implemented by the input feature. The labeling data may be a phoneme representation of the audio data stream.

An output phoneme is used as the training target for supervised training to obtain the neural network.

For example, it is assumed that the neural network in FIG. 8 has K output nodes, representing K output categories, for example, context-related phonemes, context-related subphones, and hidden Markov state labels. It is also assumed that the existing training data and the corresponding frame-level labels $(x_t,k_t):t=1, \ldots, T$, indicating that $x_t$ is input data belonging to a $k_t$ category. In this case, the fusion loss function, that is, $L_{finf}=L_{ce}+\lambda L_{cl}$, described in the foregoing exemplary embodiment may be used to calculate the loss function value of a series of given labels in the audio data stream relative to the labeling data, to perform the training of the neural network.

For the implementation of the automatic speech recognition system, under the action of the fusion loss function, the inter-class discrimination and the intra-class distribution compactness of depth features are simultaneously ensured, thereby improving the robustness during testing of the used neural network to unseen acoustic scenarios during training.

As an extension on this basis, the fusion loss function calculation module in the neural network shown in FIG. 8 uses a temporal multi-loss fusion function, that is, $L_{tmf}=L_{ml}+\lambda L_{ecl}$. Through the implementation of the fusion loss function calculation module, the inter-class discrimination and the intra-class discrimination are ensured.

In certain embodiments, the loss function value of the audio data stream relative to a series of given sequence labels calculated by using the temporal multi-loss fusion function is implemented by calculating the probability distribution on all possible label sequences. With the probability distribution given, the temporal multi-loss function directly maximizes the probability of correct labels while penalizing the distance between the depth feature and the corresponding center, thereby removing the limitation by the frame-level labeling data.

In the neural network training for the automatic speech recognition system, to calculate the input feature of the training data, Fbank features of 40 dimensions are extracted with a frame length of 25 ms and a frame shift of 10 ms, and a vector of 120 dimensions constructed by first and second order differences thereof is calculated. After normalization, five frame vectors before and after the current frame are spliced to form an input feature vector of 120*(5+5+1) =1320 dimensions, that is, the foregoing depth feature corresponding to the time frame.

The network structure and hyperparameters of the neural network are configured as shown in Table 1. As pointed out above, the network structure first includes two two-dimensional convolutional layers, quantities of output channels are 64 and 80 respectively, the kernel size of each layer is (3, 3), and the stride is (1, 1). Each convolutional layer is connected to a maxpool layer with a kernel size being (2, 2) and a stride being (2, 2). Five layers of LSTM layer are then connected, a quantity of hidden nodes of each layer is 1024, and a quantity of output nodes is 512. A fully connected layer is then connected, and a quantity of output nodes corresponds to K output categories. For example, 12 K context-related phonemes may be used in the detailed implementation.

TABLE 1

A configuration example of the network structure in the neural network used in the present disclosure.

| Network layer | Hyperparameter |
| --- | --- |
| Conv2d_1 | Kernel_size = (3, 3), stride = (1, 1), out_channels = 64 |
| Max_pool_1 | Kernel_size = (2, 2), stride = (2, 2) |
| Conv2d_2 | Kernel_size = (3, 3), stride =(1, 1), out_channels = 80 |
| Max_pool_2 | Kernel_size = (2, 2), stride = (2, 2) |
| LSTM (5 layers) | Hidden_size = 1024, with peephole, output_size = 512 |
| Fully connected layer | Output_size = 12K |

Based on the network architecture configured in the foregoing configuration example, a fusion loss function, that is, $L_{finf}=L_{ce}+\lambda L_{cl}$, or a temporal multi-loss fusion function, may be used for training. For a training process using the fusion loss function $L_{finf}=L_{ce}+\lambda L_{cl}$, in a training process under noise-free and clean speech conditions, a specified weighting factor $\lambda$ is 1e-3; and in a training process under noisy speech conditions, the specified weighting factor $\lambda$ is 1e-4. An Adam method is used for an optimization algorithm for the training. A learning rate is set to an initial value of 1e-4 at the beginning of the training, and when an average verification likelihood value (calculated after every 5 K of batch training) does not decrease for three consecutive times, the learning rate is halved. If the average verification likelihood value does not decrease for eight consecutive times, the training is terminated in advance.

Figure 9:
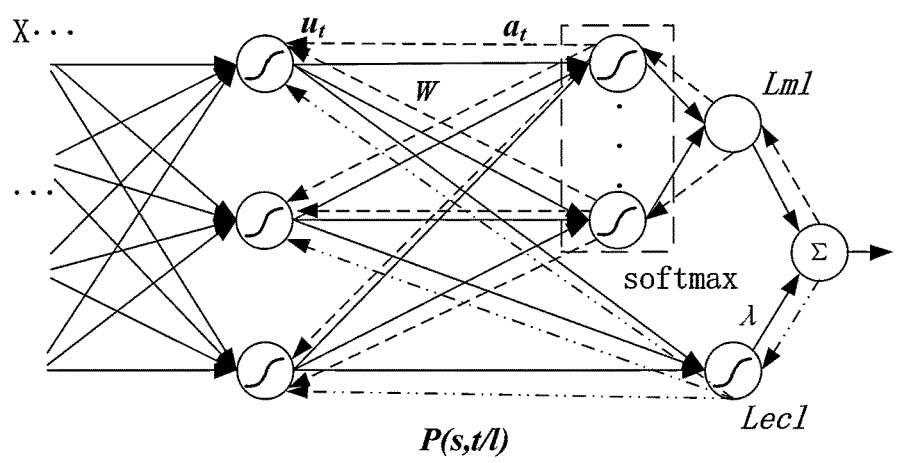
FIG. 9 is a schematic diagram of forward propagation and backward propagation of error signal streams when a neural network is supervised and trained by using a fusion loss function according to one or more embodiments of the present disclosure.

For the neural network training by using the temporal multi-loss function, because the temporal multi-loss fusion function is also differentiable, a standard backward propagation algorithm may be used for the training. Based on the foregoing audio recognition method, correspondingly, FIG. 9 is a schematic diagram of forward propagation and backward propagation of error signal streams when a neural network is supervised and trained by using a fusion loss function according to an exemplary embodiment.

For example, the learning algorithm of the temporal multi-loss fusion function includes: an input part, that is, a training label pair $(x, z) \in S$ is used as an input, and an initialization parameter $\theta$ of the convolutional layer and the LSTM layer, an initialization weight parameter W and an initialization center vector $\{c_j|j=1, 2, \ldots, K\}$ of the fully connected layer, a weight factor $\lambda$, batch momentum $\mu$, and a learning rate $\gamma$ are set; and an output part, where in the learning algorithm of the temporal multi-loss fusion function, parameters $\theta$ and W are adjusted, and parameters of the center vector are updated after the blank label is inserted.

In certain embodiments, and according to the temporal multi-loss function, a backward propagation error signal generated by the CTC loss function $$L_{ml} = -\sum_{(x,z)\in S} \ln(p(z|x))$$

is calculated. As shown in FIG. 9, through the softmax layer, a backward propagation error signal, that is, $$\delta_{ecl} = \frac{\partial L_{ecl}}{\partial u_t} = \sum_s \alpha_t(s)\beta_t(s)(u_t - c_{z'_s}),$$

of the log-likelihood cost $L_{ml}$ of the audio data stream can be obtained.

A backward propagation error signal generated by the condition expected center loss function is then calculated, that is:

$$\delta_{ecl} = \frac{\partial L_{ecl}}{\partial u_t} = \sum_s \alpha_t(s)\beta_t(s)(u_t - c_{z'_s}).$$

Through the penultimate layer in FIG. 9, a fused backward propagation error signal is calculated, that is:

$$\delta = W^T \delta_{ml} + \lambda \delta_{ecl}.$$

According to a chain criterion, the adjusted values $\Delta W$ and $\Delta\theta$ of the parameters $W$ and $\theta$ of the foregoing backward propagation error signals $\delta_{ml}$ and $\delta$ are used.

The center vector is updated, that is:

$$c_{z'_s} = c_{z'_s} - \mu \sum_t \alpha_t(s)\beta_t(s)(c_{z'_s} - u_t).$$

The rest is deduced by analogy, until convergence is implemented.

The neural network obtained through the foregoing loss function training is applicable to the automatic speech recognition system, to obtain robustness to unseen acoustic conditions.

In certain embodiments, other training methods may also be used to obtain the robustness of the neural network to unseen acoustic conditions based on the method described in the present disclosure.

Apparatus embodiments of the present disclosure are described below, and are used to perform the embodiments of the foregoing audio recognition method of the present disclosure. For details not disclosed in the apparatus embodiments of the present disclosure, refer to the embodiments of the audio recognition method of the present disclosure.

Figure 10:
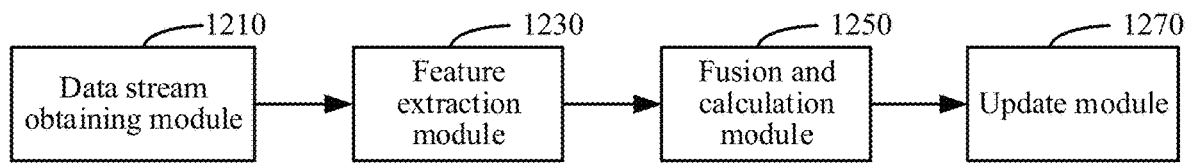
FIG. 10 is a schematic block diagram of an audio recognition system according to one or more embodiments of the present disclosure.

FIG. 10 is a block diagram of an audio recognition system according to an exemplary embodiment. In an exemplary embodiment, as shown in FIG. 10, the audio recognition system includes, but is not limited to: a data stream obtaining module 1210, a feature extraction module 1230, a fusion and calculation module 1250, and an update module 1270.

The data stream obtaining module 1210 is configured to obtain an audio data stream for neural network training of audio recognition, the audio data stream including audio data respectively corresponding to a plurality of time frames.

The feature extraction module 1230 is configured to perform, for different audio data of each time frame in the audio data stream, feature extraction in each layer of a trained neural network, to obtain a depth feature outputted by a corresponding time frame.

The fusion and calculation module 1250 is configured to fuse, for a given label in labeling data, an inter-class confusion measurement index and an intra-class distance penalty value relative to the given label in a set loss function for the audio data stream through the depth feature.

The update module 1270 is configured to obtain, through fusion, a loss function value relative to a series of given labels in the labeling data, to update a parameter in the neural network.

Figure 11:
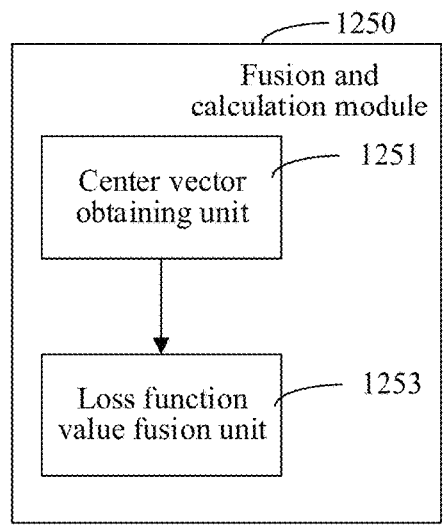
FIG. 11 is a schematic block diagram of a fusion and calculation module according to one or more embodiments of the present disclosure.

FIG. 11 is a block diagram of a fusion and calculation module according to the embodiment corresponding to FIG. 10. In an exemplary embodiment, as shown in FIG. 11, the fusion and calculation module 1250 includes: a center vector obtaining unit 1251, configured to obtain, for the given label in the labeling data, a center vector corresponding to a category to which the given label belongs, the center vector being used for describing centers of all depth features in the category; and a loss function value fusion unit 1253, configured to fuse, according to the depth feature and the center vector, an inter-class confusion measurement index and an intra-class distance penalty value relative to the given label in a set loss function for audio data of the time frame, to obtain a loss function value of the audio data relative to the given label.

In another exemplary embodiment, the loss function value fusion unit 1253 is further configured to calculate a center loss of the given label by using the depth feature and the center vector, to obtain an intra-class distance penalty value of the audio data of the time frame relative to the given label.

In another exemplary embodiment, the loss function value fusion unit 1253 is further configured to calculate, according to the depth feature, an inter-class confusion measurement index of the audio data of the time frame relative to the given label by using a cross-entropy loss function.

In another exemplary embodiment, the loss function value fusion unit 1253 is further configured to perform weighting calculation on the intra-class distance penalty value and the inter-class confusion measurement index of the audio data relative to the given label in the set loss function according to a specified weighting factor, to obtain the loss function value of the audio data relative to the given label.

Figure 12:
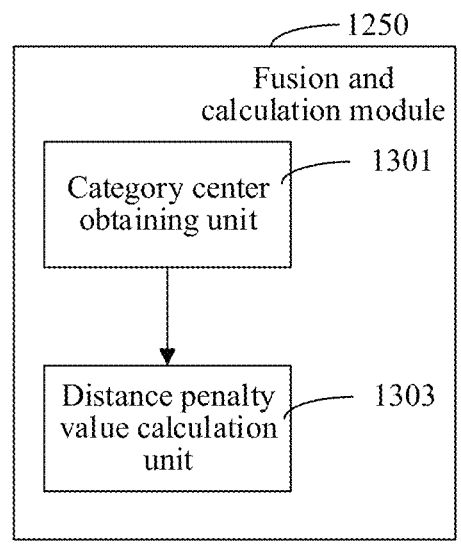
FIG. 12 is a schematic block diagram of a fusion and calculation module referenced in FIG. 10 according to one or more embodiments of the present disclosure.

FIG. 12 is a block diagram of a fusion and calculation module in another exemplary embodiment according to the embodiment corresponding to FIG. 10. In an exemplary embodiment, a blank label is added to the labeling data. As shown in FIG. 12, the fusion and calculation module 1250 includes: a category center obtaining unit 1301, configured to obtain center vectors corresponding to categories to which the given label in the labeling data and the added blank label belong; and an intra-class distance penalty value calculation unit 1303, configured to calculate, for a depth feature sequence formed by the audio data stream for the depth feature in a time sequence, a probability that the audio data stream is mapped to a given sequence label and distances of the given sequence label respectively relative to the center vectors, to obtain an intra-class distance penalty value of the audio data stream relative to the given sequence label, where the given sequence label includes the added blank label and the given label.

In another exemplary embodiment, the fusion and calculation module 1250 further includes a probability distribution calculation unit. The probability distribution calculation unit is configured to: calculate a probability distribution of the audio data stream relative to the given sequence label according to the depth feature, and calculate a log-likelihood cost of the audio data stream through the probability distribution as an inter-class confusion measurement index of the audio data stream relative to the given sequence label.

In another exemplary embodiment, the fusion and calculation module 1250 further includes a weighting calculation unit. The weighting calculation unit is configured to perform weighting calculation on the inter-class confusion measurement index and the intra-class distance penalty value of the audio data stream relative to the given sequence label in the set loss function according to a specified weighting factor, to obtain a loss function value of the audio data stream relative to the given sequence label.

Figure 13:
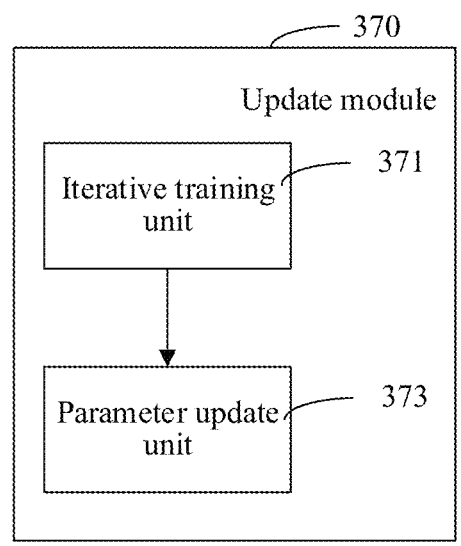
FIG. 13 is a schematic block diagram of an update module referenced in FIG. 10 according to one or more embodiments of the present disclosure.

FIG. 13 is a block diagram of an update module according to the embodiment corresponding to FIG. 10. In an exemplary embodiment, as shown in FIG. 13, the update module 370 includes: an iterative training unit 371, configured to obtain, through fusion, a loss function value relative to a series of given labels in the labeling data, to perform iterative training of updated parameters in each layer of the neural network, until a minimum loss function value is obtained; and a parameter update unit 373, configured to update a parameter corresponding to the minimum loss function value to each layer of the neural network.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Optionally, the present disclosure further provides a machine device. The machine device may be applied to the implementation environment in FIG. 1, to perform all or some of the steps in the method shown in any one of FIG. 3, FIG. 4, FIG. 5, FIG. 6, and FIG. 7. The apparatus includes: a processor; and a memory, configured to store processor executable instructions, where the processor is configured to implement the foregoing method.

A specific implementation of operations performed by the processor of the apparatus in this embodiment is described in detail in the foregoing embodiments. Details are not described herein.

In addition, an embodiment of the present disclosure further provides a storage medium. The storage medium includes a stored program, the program, when run, implementing the steps in any implementation of the foregoing method.

In addition, an embodiment of the present disclosure further provides a computer program product including instructions, the computer program product, when run on a computer, causing the computer to implement the steps in any implementation of the foregoing method.

The present disclosure is not necessarily limited to the precise structures described above and shown in the accompanying drawings, and various modifications and changes may be made without departing from the scope of the present disclosure. The scope of the present disclosure is described by the appended claims.

What is claimed is:

1. A neural network training method for implementing audio recognition, applicable to an audio recognition terminal, the method comprising:

obtaining an audio data stream for neural network training of audio recognition, the audio data stream including audio data respectively corresponding to a plurality of time frames;

performing, for different audio data of each time frame in the audio data stream, feature extraction in each layer of a trained neural network, to obtain a depth feature outputted by a corresponding time frame;

fusing, for a given label in labeling data, an inter-class confusion measurement index and an intra-class distance penalty value relative to the given label in a set loss function for the audio data stream through the depth feature; and obtaining, through fusion, a loss function value relative to a series of given labels in the labeling data, to update a parameter in the neural network.

2. The method according to claim 1, wherein the obtaining an audio data stream for neural network training of audio recognition comprises:

obtaining a noisy and continuous audio data stream and training data with the neural network as labeling data.

3. The method according to claim 1, wherein the fusing the inter-class confusion measurement index and the intra-class distance penalty value comprises:

obtaining, for the given label in the labeling data, a center vector corresponding to a category to which the given label belongs, the center vector being used for describing centers of all depth features in the category; and fusing, according to the depth feature and the center vector, an inter-class confusion measurement index and an intra-class distance penalty value relative to the given label in a set loss function for audio data of the time frame, to obtain a loss function value of the audio data relative to the given label.

4. The method according to claim 3, wherein the fusing the inter-class confusion measurement index and the intra-class distance penalty value comprises:

calculating a center loss of the given label by using the depth feature and the center vector, to obtain an intra-class distance penalty value of the audio data of the time frame relative to the given label.

5. The method according to claim 4, wherein the fusing the inter-class confusion measurement index and the intra-class distance penalty value further comprises:

calculating, according to the depth feature, an inter-class confusion measurement index of the audio data of the time frame relative to the given label by using a cross-entropy loss function.

6. The method according to claim 4, wherein the fusing the inter-class confusion measurement index and the intra-class distance penalty value further comprises:

performing weighting calculation on the intra-class distance penalty value and the inter-class confusion measurement index of the audio data relative to the given label in the set loss function according to a specified weighting factor, to obtain the loss function value of the audio data relative to the given label.

7. The method according to claim 6, wherein audio data of different time frames in the audio data stream is labeled through the given label in the labeling data.

8. The method according to claim 1, wherein a blank label is added to the labeling data, and the fusing the inter-class confusion measurement index and the intra-class distance penalty value comprises:

obtaining center vectors corresponding to categories to which the given label in the labeling data and the added blank label belong; and calculating, for a depth feature sequence formed by the audio data stream for the depth feature in a time sequence, a probability that the audio data stream is mapped to a given sequence label and distances of the given sequence label respectively relative to the center vectors, to obtain an intra-class distance penalty value of the audio data stream relative to the given sequence label, the given sequence label comprising the added blank label and the given label.

9. The method according to claim 8, wherein the fusing the inter-class confusion measurement index and the intra-class distance penalty value further comprises:

calculating a probability distribution of the audio data stream relative to the given sequence label according to the depth feature, and calculating a log-likelihood cost of the audio data stream through the probability distribution as an inter-class confusion measurement index of the audio data stream relative to the given sequence label.

10. The method according to claim 8, wherein the fusing the inter-class confusion measurement index and the intra-class distance penalty value further comprises:

performing weighting calculation on the inter-class confusion measurement index and the intra-class distance penalty value of the audio data stream relative to the given sequence label in the set loss function according to a specified weighting factor, to obtain a loss function value of the audio data stream relative to the given sequence label.

11. The method according to claim 10, wherein the labeling data of the audio data stream is an unaligned discrete label string, a blank label is added to the discrete label string, and the added blank label and the given label in the labeling data respectively correspond to audio data of different time frames in the audio data stream.

12. The method according to claim 1, wherein the obtaining the loss function value comprises:

obtaining, through fusion, a loss function value relative to a series of given labels in the labeling data, to perform iterative training of updated parameters in each layer of the neural network, until a minimum loss function value is obtained; and updating a parameter corresponding to the minimum loss function value to each layer of the neural network.

13. A neural network training system for implementing audio recognition, the audio recognition system comprising: a memory storing computer program instructions; and a processor coupled to the memory and configured to execute the computer program instructions to perform:

obtaining an audio data stream for neural network training of audio recognition, the audio data stream including audio data respectively corresponding to a plurality of time frames;

performing, for different audio data of each time frame in the audio data stream, feature extraction in each layer of a trained neural network, to obtain a depth feature outputted by a corresponding time frame;

fusing, for a given label in labeling data, an inter-class confusion measurement index and an intra-class distance penalty value relative to the given label in a set loss function for the audio data stream through the depth feature; and obtaining, through fusion, a loss function value relative to a series of given labels in the labeling data, to update a parameter in the neural network.

14. The neural network training system according to claim 13, wherein the fusing the inter-class confusion measurement index and the intra-class distance penalty value comprises:

obtaining, for the given label in the labeling data, a center vector corresponding to a category to which the given label belongs, the center vector being used for describing centers of all depth features in the category; and fusing, according to the depth feature and the center vector, an inter-class confusion measurement index and an intra-class distance penalty value relative to the given label in a set loss function for audio data of the time frame, to obtain a loss function value of the audio data relative to the given label.

15. The neural network training system according to claim 14, wherein the fusing the inter-class confusion measurement index and the intra-class distance penalty value comprises:

calculating a center loss of the given label by using the depth feature and the center vector, to obtain an intra-class distance penalty value of the audio data of the time frame relative to the given label.

16. The neural network training system according to claim 15, wherein the fusing the inter-class confusion measurement index and the intra-class distance penalty value further comprises:

calculating, according to the depth feature, an inter-class confusion measurement index of the audio data of the time frame relative to the given label by using a cross-entropy loss function.

17. The neural network training system according to claim 15, wherein the fusing the inter-class confusion measurement index and the intra-class distance penalty value further comprises:

performing weighting calculation on the intra-class distance penalty value and the inter-class confusion measurement index of the audio data relative to the given label in the set loss function according to a specified weighting factor, to obtain the loss function value of the audio data relative to the given label.

18. A non-transitory computer-readable storage medium storing computer program instructions executable by at least one processor to perform:

obtaining an audio data stream for neural network training of audio recognition, the audio data stream including audio data respectively corresponding to a plurality of time frames;

performing, for different audio data of each time frame in the audio data stream, feature extraction in each layer of a trained neural network, to obtain a depth feature outputted by a corresponding time frame;

fusing, for a given label in labeling data, an inter-class confusion measurement index and an intra-class distance penalty value relative to the given label in a set loss function for the audio data stream through the depth feature; and obtaining, through fusion, a loss function value relative to a series of given labels in the labeling data, to update a parameter in the neural network.

19. The non-transitory computer-readable storage medium according to claim 18, wherein the fusing the inter-class confusion measurement index and the intra-class distance penalty value comprises:

obtaining, for the given label in the labeling data, a center vector corresponding to a category to which the given label belongs, the center vector being used for describing centers of all depth features in the category; and fusing, according to the depth feature and the center vector, an inter-class confusion measurement index and an intra-class distance penalty value relative to the given label in a set loss function for audio data of the time frame, to obtain a loss function value of the audio data relative to the given label.

20. The non-transitory computer-readable storage medium according to claim 19, wherein the fusing the inter-class confusion measurement index and the intra-class distance penalty value comprises:
    calculating a center loss of the given label by using the depth feature and the center vector, to obtain an intra-class distance penalty value of the audio data of the time frame relative to the given label.

* * * * *